United States Patent [19]

Latham

[11] Patent Number: 5,509,110
[45] Date of Patent: Apr. 16, 1996

[54] METHOD FOR TREE-STRUCTURED HIERARCHICAL OCCLUSION IN IMAGE GENERATORS

[75] Inventor: Roy W. Latham, Fremont, Calif.

[73] Assignee: Loral Aerospace Corporation, New York, N.Y.

[21] Appl. No.: 53,518

[22] Filed: Apr. 26, 1993

[51] Int. Cl.$^6$ .................................................. G06T 15/40
[52] U.S. Cl. ................................... 395/121; 395/122
[58] Field of Search .......................... 395/161–163, 395/119, 122, 123, 127, 121

[56] References Cited

PUBLICATIONS

Zhou et al., "A Volume Sorting Hidden–Surface Algorithm", Computer Software and Application Conf, (1989) COMP-SAC.
Samet et al. "Hierarchical Data Structures and Algorithms for Computer Graphics", IEEE Computer Graphics and Application Mag., (Jul. 1988).
Foley et al, *Computer Graphics, Principles and Practices*, Addison–Wesley Pub Co. 2ed (1990).
Pommert et al., "Surface Shading in Tomographic Volume Visualization: A Comparative Study", Visualization in Biomedical Computing (1990).
Fuchs, Henry, et al., *Near Real–Time Shaded Display of Rigid Objects*, Computer Graphics, vol. 17, No. 3, pp. 65–72, (Jul. 1983).
Fuchs, Henry, et al, On Visible Surface Generation by a Priori Tree Structure, Computer Graphics, SIGGRAPH '80 Conference Proceedings, pp. 124–133, (Jul. 14–18, 1980).

*Primary Examiner*—Heather R. Herndon
*Assistant Examiner*—Rudolph J. Buchel
*Attorney, Agent, or Firm*—Roy W. Latham

[57] ABSTRACT

A method for determining which objects are visible in each pixel of a digitally-generated image is described. The method uses comparison of distances from the viewpoint (Z-sorting) for occlusion. The number of Z comparisons required is minimized by utilizing a hierarchy of regions in the screen area, and thereby, resolving occlusion for areas larger than pixel areas where possible. Use of the area hierarchy increases the efficiency of the occlusion processing. In a preferred implementation, the screen is divided into equal-sized horizontal regions each corresponding to typically four scanlines. Polygons for each image are subdivided into pieces that correspond to the preset hierarchy of regions, and occlusion processing occurs independently in parallel for two or more regions. Each region is subdivided further into smaller regions, each level of the hierarchy having regions half the size of a higher level region. The minimum and maximum Z values of a polygon's contribution to a region are compared to previously determined values for a hierarchy of subregions. Occlusion is accomplished at the highest level of the hierarchy at which portions of the incoming polygon contribution either occlude or are occluded by previous polygons. Provisions are made for transparent and interpenetrating polygons.

10 Claims, 7 Drawing Sheets

| POINTER TO PARENT NODE |
|---|
| POINTER TO FIRST CHILD |
| ⋮ |
| POINTER TO LAST CHILD |
| MINIMUM X, THIS NODE |
| MAXIMUM X, THIS NODE |
| MINIMUM Z, ALL SPANS |
| MAXIMUM Z, TOTALLY COVERING SPANS |
| POINTER TO UNRESOLVED SPAN LIST |

METHOD FOR TREE-STRUCTURED HIERARCHICAL OCCLUSION IN IMAGE GENERATORS

FIELD OF THE INVENTION

This invention, generally, relates to digital image generators as used in flight simulation and, more particularly, to a new and improved method for operating a digital image generator that uses occlusion or antialiasing in the processing of data.

BACKGROUND OF THE INVENTION

Digital image generators are used to produce sequences of video images in real time corresponding to a user's changing position and orientation in a database of digitally-described objects. Digital image generators have found widespread utility for flight simulation, military training simulation and, increasingly now, for general training and for entertainment systems.

Basic methods for producing digitally generated images from arbitrary positions and with arbitrary orientations in a three dimensional polygonal database are described by James D. Foley in *Computer Graphics*, Second Edition, Addison-Wesley Publishing Company, 1990. All digital image generation methods must deal with a central problem: how to determine, for each pixel in the image, which polygons in the database make a visible contribution to the pixel's color and intensity and which are occluded and made no contribution. Two general approaches to this problem involve what are called priority lists and z-sorting.

With the priority-list based approaches, at some early stage of the image generation process, an ordered list of polygons that are near or within the boundaries of the to-be-generated image is produced for use in later stages of this processing. When two polygons are projected to the same region of the screen, competing for the same pixels and subpixels, the contribution taken for a pixel or a subpixel is that of the polygon that appears earlier on this list.

Contributions to individual pixels and regions are accumulated from the polygons, in the order in which they appear on the list, until these pixels and regions are considered complete. Possible contributions to these pixels from polygons farther down the list are ignored.

Any incorrect ordering of the polygons on this priority list can produce anomalies in the displayed image. This priority list method for the determination of occlusion relationships is inherent in image generators employing the methods described in the following patents: U.S. Pat. No. 4,570,233 to Johnson Yan, et. al. on Feb. 11, 1986; and U.S. Pat. No. 4,811,245 to William Bunker, et.al. on Mar. 7, 1989.

Image generators that rely on priority lists to determine occlusion relationships require more elaborate database structures to facilitate the determination of a correct priority ordering for the potentially displayable polygons. In addition, certain geometric arrangements of the database elements do not allow a priority list ordering (for example, interpenetrating polygons), and thus, limitations are necessary on the placement of polygons within the databases of these types of image generators. These limitations become particularly troublesome when there are moving models in the generated image.

With z-sorting approaches, occlusion determination takes place near the end of the image generation process. With this type of approach, when polygons contend for a contribution to a given pixel, this contention is resolved at this pixel level by comparing the z values at this pixel of the contending polygons (the contributions of the polygons with the smallest z values are used).

Occlusion processing approaches that employ z sorting can be computationally intensive because it is necessary to compute and compare z values for every polygon at every pixel and subpixel for which there is contention. In U.S. Pat. No. 4,918,626 to Gary Watkins, et.al. on Apr. 17, 1990, a method is described that saves some of the computations; however, contention resolution is still accomplished at the pixel and subpixel level on a polygon by polygon basis.

In U.S. Pat. No. 4,594,673 to James R. Holly, et.al. on Jun. 10, 1986, a scanline oriented method is described that can accomplish the sorting of polygons along scanlines without resorting to pixel z comparisons. This method, however, does not incorporate the processing of non-opaque (translucent) polygons, but rather, it also requires many comparisons of a current polygon with previously processed polygons in most cases, even though the current polygon may clearly be occulted by or may occult all of the other polygons.

Thus, prior art methods using priority lists accomplish occlusion processing efficiently but require special database structures. They have difficulties with objects moving in the scene. Z sorting methods eliminate the constraints of database structures and have no difficulty with moving objects, but they are computationally intensive due to the large number of Z comparisons required and, as a result, tend to be expensive to implement.

OBJECTS AND SUMMARY OF THE INVENTION

Therefore, it is an object of the present invention to provide a method for occlusion and antialiasing processing in image generators that is feasible for all types of database, even if in which the polygons are interpenetrating or intersecting.

It is also an object of the present invention to provide a method of occlusion and antialiasing processing that is effective for generating high quality computer graphics imagery.

Further, it is also an object of the present invention to provide an occlusion processing method that minimize the computations usually required.

Briefly, the present invention involves occlusion in digital image generators that minimizes the number of Z comparisons required by utilizing a hierarchy of regions in the screen area. The screen is divided into horizontal regions of equal size corresponding to a number scanlines. Polygons for each image are subdivided into pieces corresponding to the regions before the occlusion processing occurs, independently in parallel, for two or more regions. The minimum and maximum Z values of a polygon's contribution to a region are compared to previously determined values for a hierarchy of subregions. Occlusion is accomplished at the highest level of the hierarchy at which portions of the incoming polygon contribution either occlude or are occluded by previous polygons.

BRIEF DESCRIPTION OF THE DRAWINGS

FIG. 4 is an illustration, in FIG's. 4A–4F, of a way that an occlusion tree can be formed in six steps as an aid in description of the present invention.

DETAILED DESCRIPTION OF THE INVENTION

Certain key terminology, to be used in this detailed description, is defined as follows:

A "polygon" in the context of this description is planar and convex, and generally, it has three sides (a triangle) or four sides (a quad). These triangles and quads do not come into play in the occlusion algorithm of this invention, but they do simplify its implementation substantially.

In simulation parlance, a polygon is commonly called a "face".

A "screen area" is the two dimensional, usually rectangular, region of the generated image.

A "hierarchy of regions" is a data structure corresponding to a two dimensional area, wherein the top level of the hierarchy corresponds to the whole region, the second level corresponds to two or more subregions that cover the whole region without overlap, and in subsequent levels, each subregion provides more fine subdivisions of the subregions of the previous level of the hierarchy. The present invention deals with a hierarchy of regions for the screen area in which the finest subdivisions are pixel areas.

A "scanline" is a horizontal row of single pixels running the full width of the generated image. A contiguous set of scanlines identifies a "scanstrip" or, more briefly, a "scan". The number of scanlines in a scan is implementation dependent.

Each scan is considered as a row of equal sized "blocks"; each block is a rectangular portion of the screen and is a given number of pixels wide and a number of scanlines of the scan high. The width of the blocks is implementation dependent. Blocks are fixed to the screen space, aligned vertically with the scans and horizontally. The blocks of a scan are numbered from left to right in screen space.

A "span" is a data packet derived from a polygon in the three dimensional image generator database. The "domain" of a span is the contiguous set of blocks of a scan that are covered or touched by the intersection of the scan and the projected screen image of the polygon. This domain is identified by its first and last block number. The data of a span also contain an identifier of the polygon from which the span is derived and a maximum and minimum Z values that can be those of the polygon in screen coordinates but may be the maximum and minimum values of the portion of the polygon over the scan.

A span is also obtained from an existing span by restricting the domain of the original span to a contiguous subset of this domain with or without modifying the Z values to conform to the minimum and the maximum values of the polygon over this subset. Thus, the data in a span consists of a polygon identifier, domain delimiters (given by starting and ending block numbers) and the maximum and minimum Z values.

A block in the domain of a span is totally covered by the span if the polygon of the span is opaque (i.e., not partially translucent nor with translucent texture) and the block is fully contained in the projected image of the polygon. Blocks in the domain of a span are partially covered if they are not totally covered. A span is totally-covering when all the blocks of its domain are totally covered by the span. Partially-covering spans are those that are not totally-covering.

The following are facts concerning spans. No span derived from a non opaque polygon (a polygon that is translucent or that has translucent texture) can be a totally-covering span; all such derived spans are partially-covering. The totally covered blocks of a span are contiguous and thus themselves from a span. Thus, every span can be subdivided into at totally-covering span and, at most, two noncontiguous, partially-covering spans (any of the three can have an empty domain). Every span derived from a totally-covering span is totally covering.

A collection of spans (for a given scan) is a totally-covering span set (over an interval of the span) (hereinafter called "TCSS") when every block in the interval is totally-covered by some span in the TCSS. Thus, totally covering span sets can contain both partially covering and totally covering spans. If span M and span N are two totally-covering spans (over some common interval), then the TCSS M occults or occludes the TCSS N (M>N) if, for every block in the interval, there is a totally-covering span in M with a minimum Z values on this block less than the corresponding Z values for all spans in N (i.e., for this block, this span in M is in front of all spans in N).

Totally-covering span sets are subject to some easy occlusion tests over common intervals. Each TCSS lies within a three dimensional box. The x and y bounds of the box are defined by the interval of the TCSS and the height of the scan. The minimum and maximum Z bounds of the box, derived from the parent polygon, may not exactly correspond to the span, but they are guaranteed to contain the span. The y-bounds of TCSS are the same for all the TCSS's on the same scan.

The following are relationships for the occlusion order of two TCSS's, M and N:

1) The priority relationship of TCSS's M and N is defined only with the region of blocks having a common range of x values.

2) Within the region of overlapping, if the minimum of all Z values of all spans in N is equal to, or greater than, the maximum of all Z values for all spans in M, then M occludes N (M>N) throughout the region. (In this case, there is a three dimensional box around M and one around N; these boxes are disjoint.)

3) The relationship described in (2), above, is strengthened when it is possible to conclude that M occludes N when the condition of (2), above, is met for any subset of spans in M that also forms a TCSS (for the same region). Thus, M>N, if minimum of all Z values of all spans in N is equal to or greater than, the maximum of all Z values of any set of spans in M that forms a TCSS for the region. In this case, the three dimensional box around N is disjoint, and behind, the box around some TCSS consisting of a subset of the spans of M. This latter box is contained in the box used for M in the test of (2); the box used for M need not be disjoint from the box used for N.

Figure 1A:
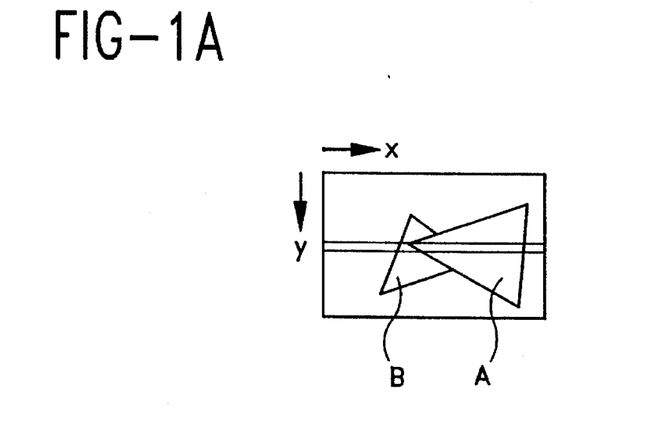
FIG. 1A is an illustration of two triangles, A and B, overlapping in screen space as an aid in the description of the invention.
Figure 1B:
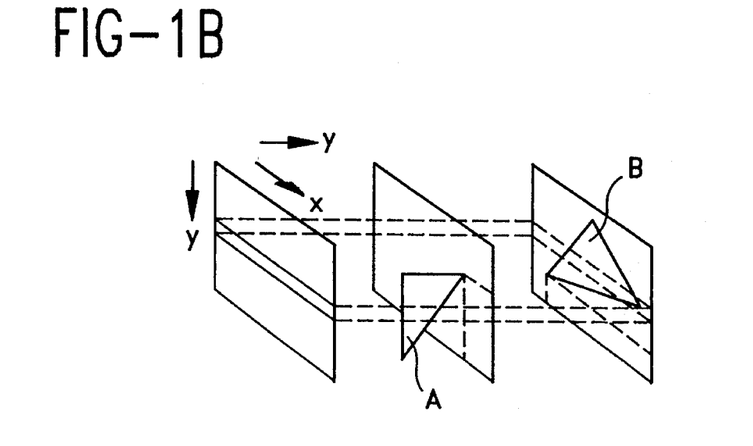
FIG. 1B shows the two triangles, A and B, in perspective space as a further aid in the description of the invention.
Figure 1C:
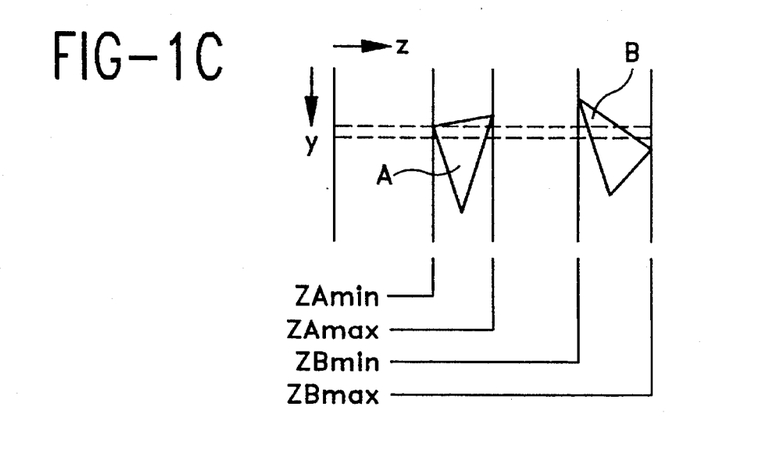
FIG. 1C is an illustration of how the Z ranges of the two triangles, A and B, do not overlap in y-z plane projections.

4) Of course, these Z comparison tests may not detect an existing occlusion relationship between two TCSS's. An example of this is described hereinafter in connection with FIG. 1.

The Z comparison test described in (2) and (3), supra, to determine occlusion relationships of TCSS's is called a min-max test or a Z-test.

In FIG. 1 of the drawings, two spans are shown as being formed from two polygons A and B. For the region of overlap of span domains, clearly visible in FIG. 1A, A>B. This is true since, as shown, for every point along the scan in the region of overlap, the Z value on the polygon A is smaller (hence closer) than the corresponding value on polygon B.

If, as shown in FIG. 1B and FIG. 1C, ZAmax<ZBmin, then the min-max test concludes that A>B without resorting to Z comparisons for each point of overlap. If ZAmax<ZBmin, the min-max test cannot conclude that A>B in the region of overlap, even though this may still be true.

The test for occlusion relationships, the min-max test, can be generalized slightly to the case where none of the spans in one of the TCSS's is totally covering. Suppose A is a span that totally covers an interval of a scan, and that min-max test shows A>B, another span in this region.

Then, the occlusion relationship will still be true even if B only partially covers the region. When A is in front of B and when A covers the whole region, then B will always be covered. If the partially covered region is in front, nothing about the occlusion relationship can be determined without more information, since it is possible that the more distant polygon will be visible in the portion of the overlap region not totally covered by B.

The problem lies in getting an efficient occlusion algorithm quickly in order to arrive at the regions of overlap, not in doing the occlusion test. The real problem is to quickly find suitably large regions to test. Working entirely on a block or pixel basis and keeping a min-max for each would result in the need to subdivide large areas of, for example, the sky polygon only to find that much of it was occluded by terrain.

One way is to build a hierarchy of regions across the scan. Consider the span as a whole, at the top of the hierarchy. If the whole span is totally covered by one TCSS, a min-max Z can be defined for the entire span, that can be used to test any succeeding span. In the case of the hill that occludes distant trees, the hill is processed earlier than the trees, the hill will cover the whole scan, and the hill span min-max will reject every tree with a single z.

A span that covers the whole scan cannot be anticipated in every case, particularly early in the processing. If it does not develop, proceed by dropping to a second level of the hierarchy in which the scan is subdivided in to small regions and, then, to a third level in which it is subdivided further, and so on, down to the block level.

Throughout this description, supra, the case where a simple min-max test resolves coverage has been emphasized, and ambiguous cases were left for later resolution. As an occlusion tree is built these "cases to be resolved later" accumulate on the bottom branches of the tree.

Each case-to-be-resolved-later is packaged as a region in space, i.e., an adjacent group of blocks whose location is implied by the position in the tree, and a list of pointers to the spans that contribute to the occlusion problem for this region. These cases are not resolved until after the entire occlusion tree is built. Until the tree is completed, there is a possibility that a span will come along and occlude the entire problem case, and it is not efficient to spend time resolving this problem until such possibility is past.

Structure of the Occlusion Tree.

Figure 2A:
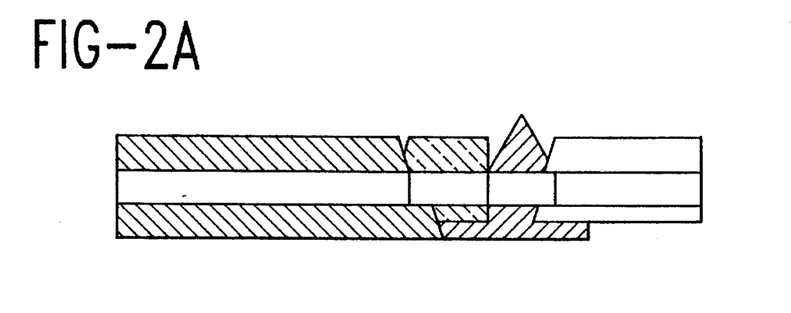
FIG. 2A is an illustration of span data on scan as an aid in describing the invention.
Figure 2B:
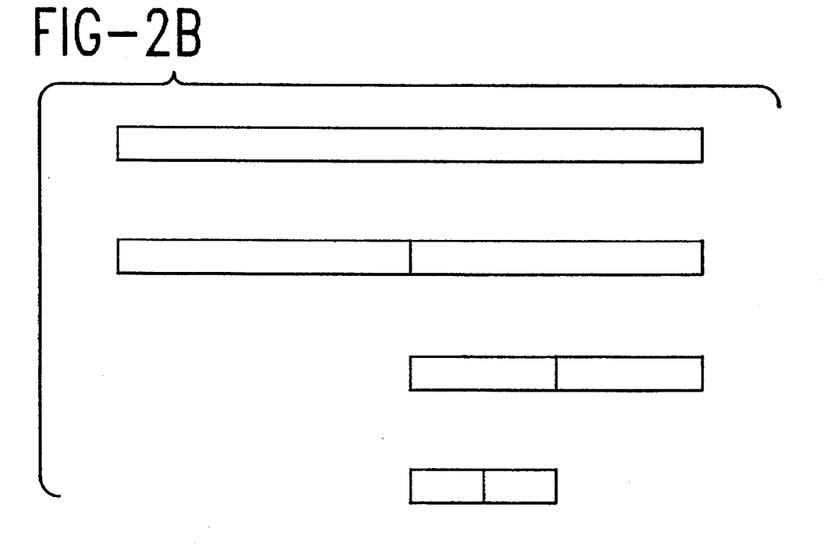
FIG. 2B is an illustration of a subdivided scan of span data for the purpose of describing the invention.
Figure 2C:
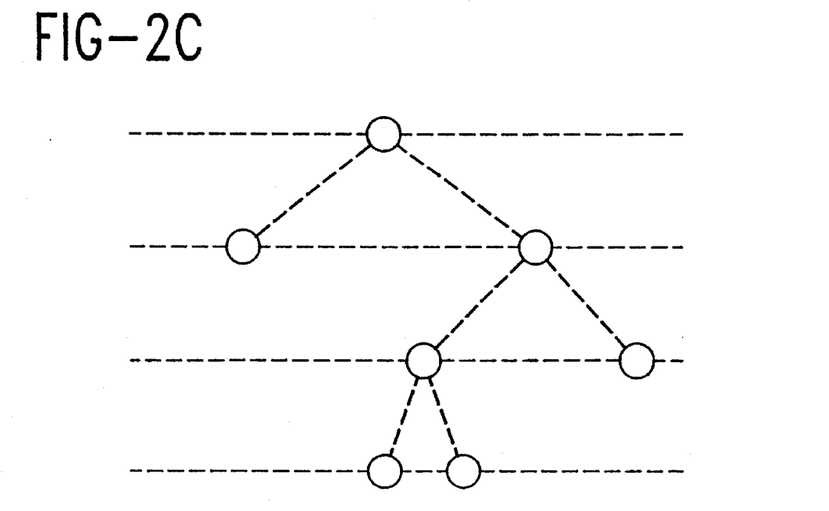
FIG. 2C is an illustration of a binary tree corresponding to a subdivided scan, for use in the description to follow.

The occlusion tree is a data structure that facilitates testing for occlusion over successively smaller portions of a scan. FIG. 2 shows successive subdivisions that are accomplished by dividing the previous interval in half; thus, creating a binary tree. The top node of the tree corresponds to the whole scan.

The left and right child nodes of the top node represent left and right subareas of the scan. Each successive level of the tree provides further subdivision of the parent intervals, until the level corresponding to a block is reached.

The tree is built from the top node down, with leaves added only as required for the input spans that have been processed. The entire tree for a span could be as small as the single top node, as would be the case where a single span covers the entire scan and is found by the min-max test to occlude all others. The tree for a span might also be fully expanded so that there is a leaf for every block on the scan; this could occur if every pixel contained a polygon edge.

Typically, the tree will be built to a point somewhere between these extremes. During the building process, an occluding span may allow an entire branch of the tree to be trimmed, so that the tree structure may "contract" as well as "expand" during processing. The example of FIG. 2 employs a binary tree. However, an implementation of this invention does not require this form of binary division. The ways that are possible to subdivide the interval in accordance with the present invention permit a variety of types of tree structures to be realized.

Figure 3:
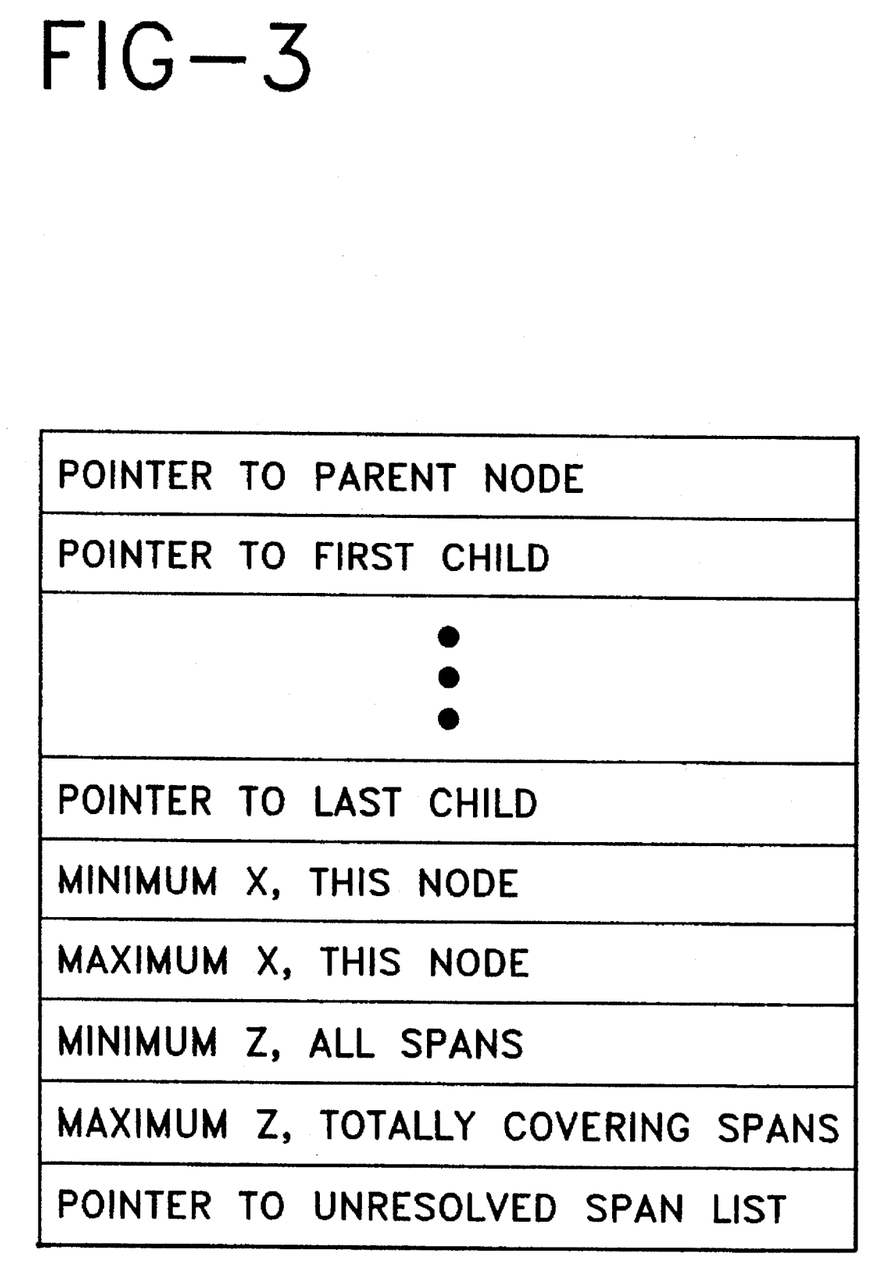
FIG. 3 is an illustration of occlusion tree node format, as a further aid in,describing the present invention.

Each node of a tree according to the invention contains pointers needed to maintain the data structure plus min-max occlusion data. The data maintained at each node is illustrated in FIG. 3 of the drawings.

The pointers include a pointer back to the parent node (null for the top node), and either pointers to the two child nodes (if it has children) or a pointer to the head of a list of spans that contribute to the region represented by the node. A maximum Z value (Zmax) and a minimum Z value (Zmin) are stored in the node.

Zmax is based only on some TCSS subset of the totally covering spans whose domain contains the region represented by the node (Zmax is the maximum of the maximum Z values of all the spans in this TCSS subset). Zmin based on both totally covering and partially covering spans that cover the region of the node.

These entries are based on different types of spans (Zmin on both partially and totally covering spans and Zmax only on totally covering spans) because, as described with the introduction of the min-max test, it is possible to conclude, for two TCSS's A and B, that A>B when a maximum Zmax of totally covering subset of A is greater or equal to the minimum Zmin of all spans in B.

Both the min and max values are needed for opaque faces, because occlusion occurs if the minimum of the occluded data is greater than the maximum of the occluding data. The node data also includes the number of the left and right end blocks of the node region. Note that a node cannot have both an unresolved-span list and child pointers; either the unresolved-span list pointer or the pair of child pointers will be null.

Initially, the tree has only the top node, corresponding to the entire scan. It may be initialized with minimum and maximum Z values for fully and partially covered spans set to a number larger than the dimensions of the database, and with the pointer to unresolved spans set to point at the background color. The parent node will remain null, and the child pointers remains initialized to null.

Tree-Building Process.

A tree is built for each scan-strip. At the start of each processing period (usually called an update period), the occlusion tree for a scan-strip is initialized to a single top node (representing the entire scan-strip) with no children and with an empty unresolved span list. Then in turn, each span (originating from a polygon in the scene that, when projected to the screen, intersects the scan) is processed.

The final occlusion tree is completed after the processing of the final span. The terminal nodes of this final tree indicate a partitioning of the scan-strip into intervals of blocks that together compose the scan-strip.

At each terminal node is an unresolved span list, i.e., a list of spans all of which have domains that contain the node's interval and none of which can be determined to occult any of the other spans on the list based on the minimum-maximum-Z tests (over the mode's interval).

An unresolved span list can contain both partially covering and totally covering spans. Each polygon in the scene can potentially result in the processing of three spans for a given scan-strip, i.e., a totally-covering span and up to two partially-covering spans.

The minimum and maximum Z values for each of these spans can always be taken from the parent polygon. Those values will nearly always be conservative, in the sense that they are loose min-max bounds.

Alternately, the minimum and maximum Z values of a span can be recomputed for the interval over which the span is being processed. These recomputed values will be more accurate than those from the parent polygon (the recomputed minimum will be no smaller and the recomputed maximum no larger than those of the parent).

Figure 6:
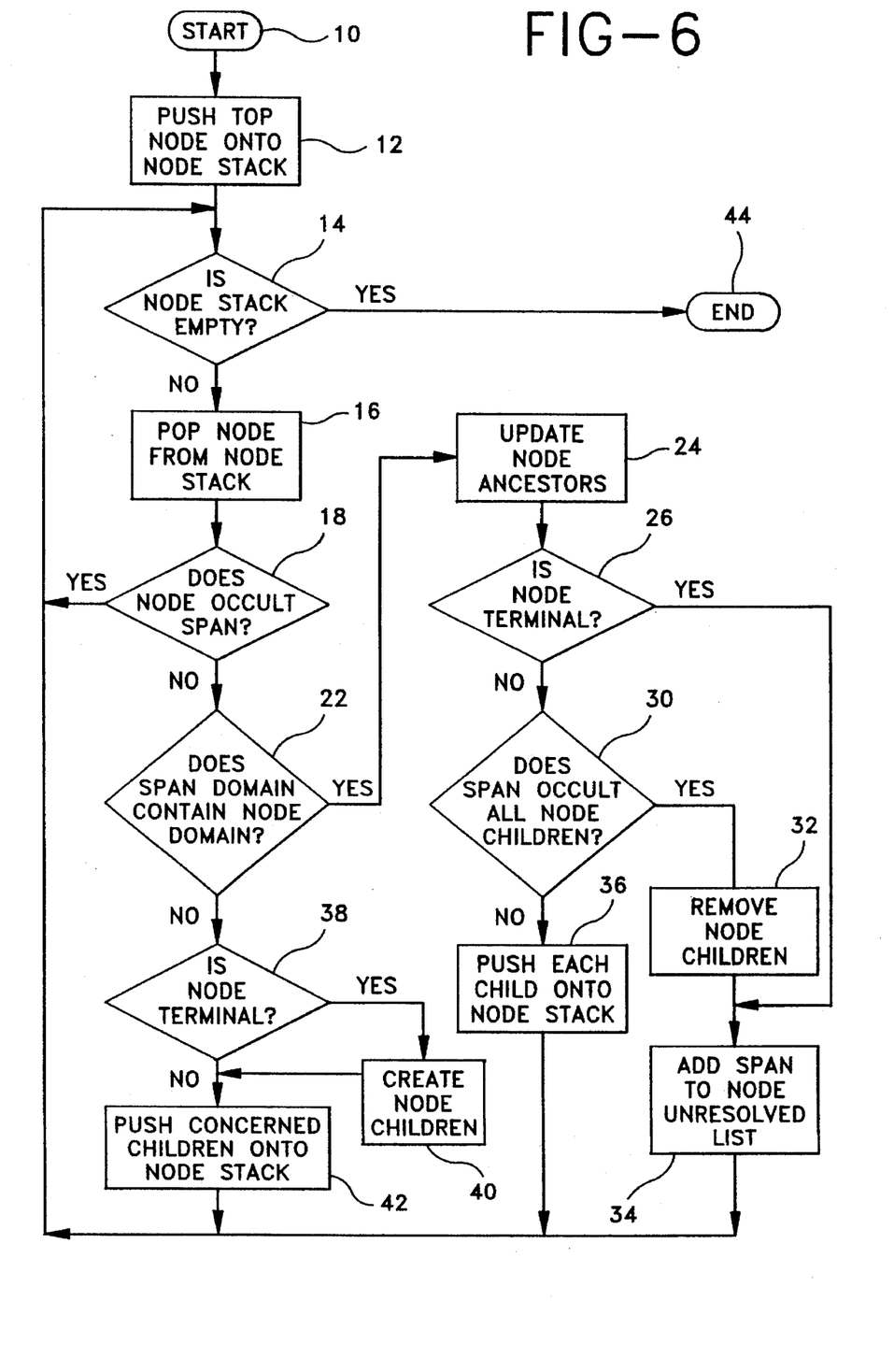
FIG. 6 is a flow chart illustrating the method of the invention in the formation of an occlusion tree.

A flowchart showing the tree-building processing method for one span, in accordance with the invention, is given in FIG. 6 of the drawings.

The processing method that is illustrated by the flowchart in FIG. 6 is for a single span and starts, step 10, with an existing occlusion tree (perhaps the initialized tree). Upon the end of the processing, step 44, an updated occlusion tree has been produced.

This occlusion tree is either the same tree as at the start, 10, of the processing of this span (in the case where this span is occulted by the collection of spans already processed in this update period) or an altered version of the starting occlusion tree in which this span now appears on unresolved list of at least one terminal node.

During the processing of a single span, a node stack is maintained. The processing of a span always starts at the top node of the existing occlusion tree.

This top node is pushed initially onto the node stack, 12, and then, it is immediately popped from the node stack, 16, after checking for an empty stack, 14. This check, 14, precedes the processing of all descendent nodes of the top node that either are created during the processing of this span or are already nodes of the trees that are determined to require processing during the processing of this span.

When the check, 14, determines that the node stack is empty, the end, 44, of the processing of this span has been reached.

For each node popped from the node stack, 16, it is determined, 18, whether the spans on this node's unresolved list occult (over the interval of the node) the span being processed using the min-max test, comparing the span's minimum Z with the minimum of the maximum Z value of a TCSS subset of the totally-covering spans on the unresolved list (this minimum Z value is determined in 24 and is kept at the node).

If the span is so occulted, the node is no longer processed, and the next node on the node stack (if there is one) is processed. The minimum and maximum Z values for the span can always be taken from the parent polygon, and these values will be conservative, in the sense that they are loose min-max bounds.

Alternately, the minimum and maximum Z values of a span can be recomputed for the interval of the node being processed. These recomputed values will be more accurate than those from the parent polygon.

If the Z-test of 18 does not show that the span is occulted, it is determined, step 22, whether the domain of the span contains that of the node, i.e., does the interval of this span contain the interval corresponding to this node. If the span domain does not contain the node domain, then the processing moves down the tree.

If this node is not terminal, step 38, the interval of the node is subdivided and children nodes of this node are formed corresponding to this subdivision. Each child inherits the unresolved list and the Z maximum and minimum of its parent, step 40.

Then, each child of this parent node, whether newly created or not, with a domain that intersects that of the span is pushed onto the node stack, step 42. Each of these children is subsequently popped from the node stack, 16, and if necessary, further subdivided.

In this manner, new children are created, each of which is in turn processed. These steps are repeated for all offspring until a node is found for each, the domain of which is contained by the span domain, step 22, or which occults the span, step 18.

For each node that does not occult the span, 18, and the domain of which is contained in the domain of the span, 22, the ancestors of this node are updated as follows, step 24:

Starting first with this node, if the span's minimum Z value is less than that of the node, replace the node's minimum Z value with that of the span. Then, go to the parent of this node and check that its minimum Z value is equal to or less than the minimum of the Zmin of all its children.

If it is larger, replace the parent's minimum Z value with this minimum value. Continue this process up the hierarchy until the top node has been processed or until a parent is found with a minimum Z-value equal to or less than the Zmin of all its children.

Next, for totally covering spans only and starting again with the node contained in the span, if the span's maximum Z value is less than that of the node, replace the node's maximum Z value with that of the span.

Then, go to the parent of this node, and check whether its maximum Z value is greater than the maximum of the Zmax values of all its children, and if it is larger, replace the parent's maximum Z value with this maximum of all children Zmax values.

Continue this process up the hierarchy until the top node has been processed or until a parent is found with a maximum Z-value that is not larger than Zmax of every child (i.e., until a parent Zmax is less than or equal to at least one Zmax of a child).

For each node that does not occult the span, step 18, the domain of which is contained in the domain of the span, step 22, and after the node's ancestors have been updated, 24, if this node is terminal, step 26, the span is added to this node's unresolved list, 34.

Otherwise, if the node does have children, step 26, and a test of Z values, step 30, indicates that all the children are occulted by the span (therefore, this is a totally-covering span and its Z maximum value is less than the Z minimum values of all the children nodes), then all these children are removed from this node, step 32. It now becomes a terminal node with only this span on its unresolved list, step 34.

If all the children are not occulted by the span, step 30, (and, therefore, this is a partially-covering span or its Z maximum value is equal to or greater than the Z minimum value of at least one of the node's children), then each child of this node is pushed onto the node stack, step 36, for further processing with this span.

Thus, for each node that does not occult the span, step 18, the domain of which is contained in the domain of the span, step 22, the processing stages 24, 26, 30 and 32 result in either the span being added to the node's unresolved list, step 24, (where its children can be removed, step 32) or the children of the node being pushed onto the node stack, step 36, for later processing.

In either case, the next stage of processing for this span is to check whether the node stack is empty, step 14. If the node stack is empty, processing of this span is complete, 44, and if it is not empty, the next node on the stack is processed.

In FIG. 4 of the drawings, an example of the occlusion tree building process is illustrated diagrammatically. The figure shows polygon data being added to a span, and it shows how the occlusion tree is built accordingly. The totally-covered Zmax values are colored in the nodes to correspond to the polygon data from which the values are derived.

Unfilled nodes have the default value of Zmax being a very large number. This corresponds to the initialized value of the top node, Zmax 50, the domain of which is the scan-strip.

In the example illustrated in FIG. 4, it is assumed that the spans 52, 54, 56, 58, 60 and 62 are all totally-covering spans, that the domains 52, 54, 56 and 58 do not overlap along the scan 50 but, together, these spans cover 50. It is assumed also that the maximum Z values of these spans have the following relationships:

Zmax 52<Zmax 62<Zmax 56<Zmax 58<Zmax 60<Zmax 50, and Zmax 52<Zmax 54<Zmax 58.

Furthermore, for the example illustrated in FIG. 4, it is assumed that, for each span, the maximum and minimum Z values are equal.

Figure 4A:
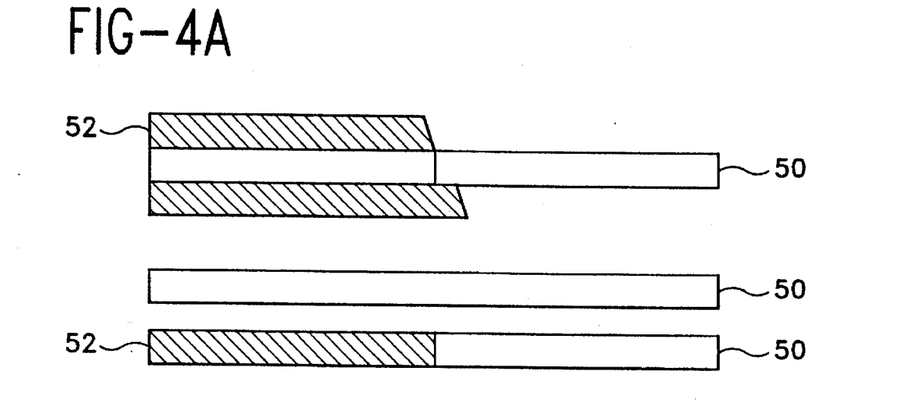

FIG. 4A through FIG. 4F illustrate the processing of the spans 52, 54, 56, 58, 60 and 62, respectively, starting in FIG. 4A with the processing of span 52 with an initialized occlusion tree having only a top node representing the entire scan, 50. Each figure in the sequence, FIG. 4A through FIG. 4F, illustrates the accumulated effects after the processing of the span corresponding to the figure.

Figure 4B:
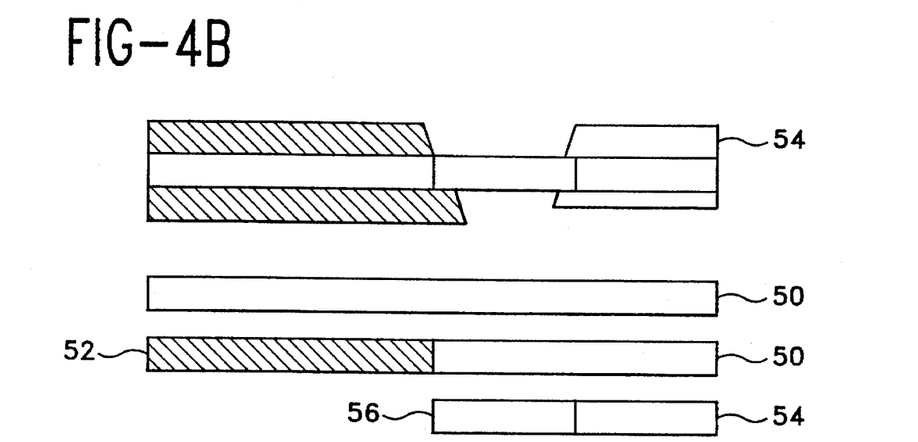
Figure 4C:
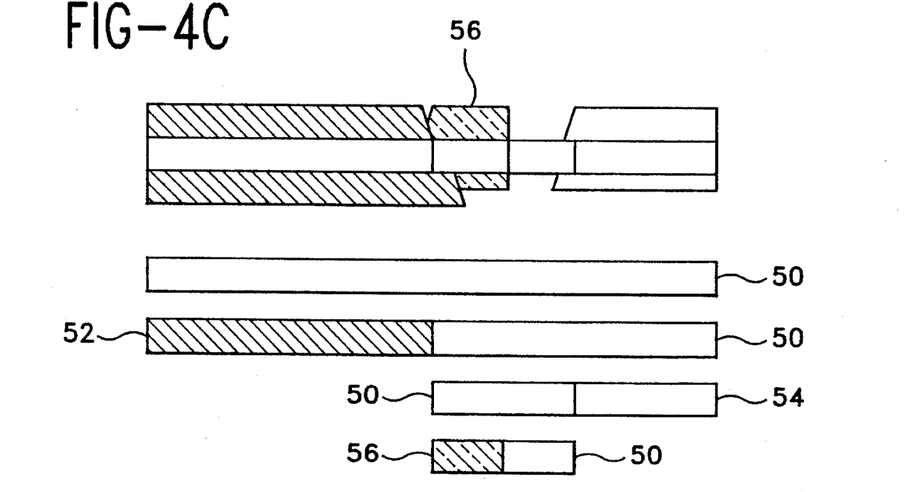

For example, FIG. 4C illustrates the first three spans (52, 54, 56) positioned along the scan 50, together with the resulting occlusion tree nodes and their maximum Z value (Zmax) after the processing of these first three spans.

In FIG. 4A, the incoming span 52 covers half of the whole scan. Two child nodes are built, one with data and the other empty (i.e., having the defaults values of the top node). The parent node representing the whole scan is not covered, so it keeps the default Zmax (50).

Figure 4D:
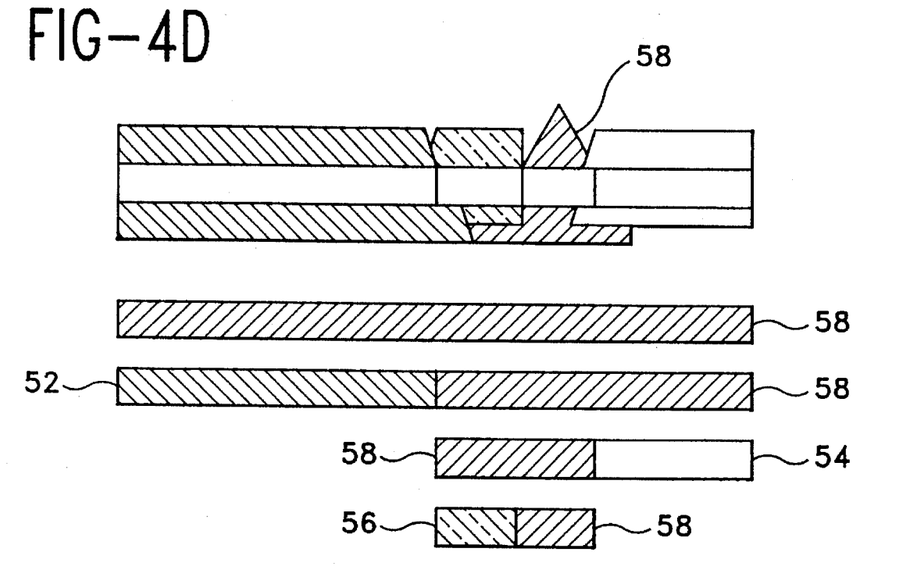

FIG. 4B adds the second, disjoint, span 54 covering a quarter of the whole scan. FIG. 4C adds another span, 56, still disjoint. In FIG. 4D, the added span, 58, completes coverage of a quarter of the scan, which in turn completes coverage of half and which, then, completes coverage of the whole.

Figure 4E:
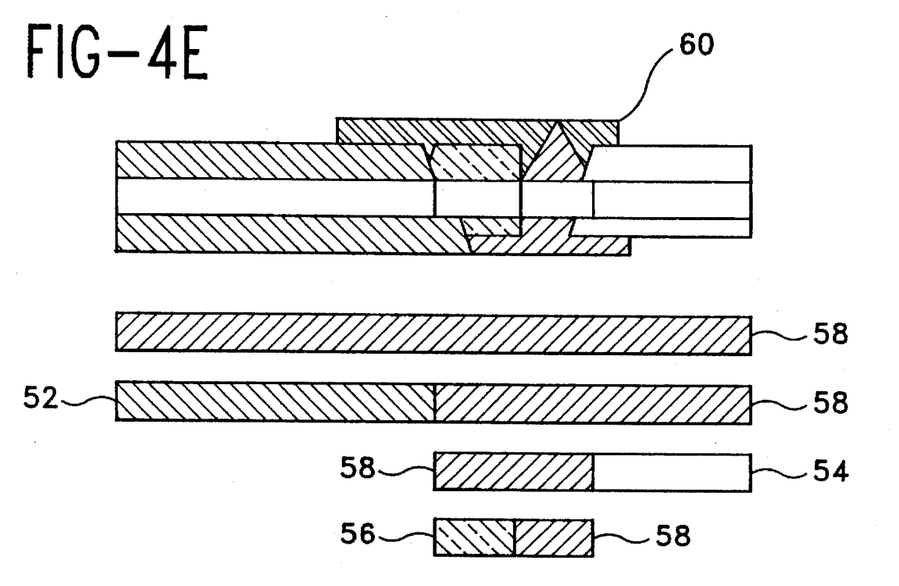

The span added in FIG. 4D happens to have the largest Zmax value, so that is the value written at each node up the hierarchy. FIG. 4E introduces span 60 having a Zmin (=Zmax 60) that is greater than Zmax 58 now written in the top node of the tree.

Therefore, the new span can be discarded as totally occluded at the first comparison in the tree. Finally, the span 52 in FIG. 4F occludes the two spans, 56 and 58, which were at the bottom level of the tree. A branch of the tree is deleted, and the maximum Z values in the hierarchy are revised.

Figure 4F:
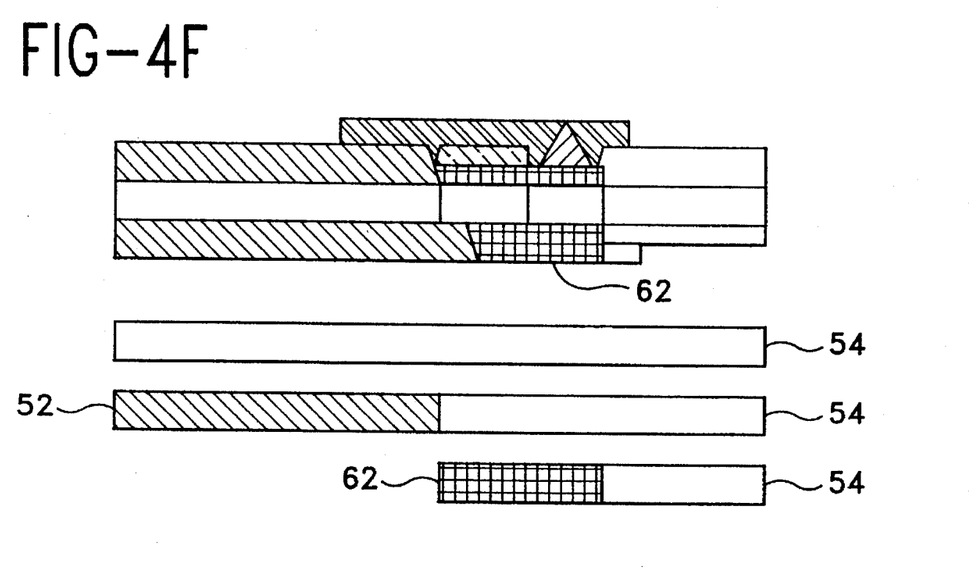

In this example, after each processing stage, the terminal nodes that do not have the default values corresponding to 50, have unresolved span list with exactly one span whose maximum Z value is indicated for the node. Thus, upon completion of the processing of all six spans, the three terminal nodes, as indicated in FIG. 4F, contain respectively the following three spans (proceeding left to right in FIG. 4F): 52, 62 and 44. Thus, if the spans of this example were the only polygons in the scene intersecting this scan, the method of the invention yields results that can be displayed on the scanlines including this scan with no additional Z comparisons, nor any further occlusion testing.

A different example is obtained if the assumptions of the example illustrated in FIG. 4 are altered slightly. The only changes to the above assumptions are: that the span 62 now is assumed not to be totally opaque. It is partially translucency and, thus, cannot occult other spans, namely, the spans 56 and 58.

It is assumed that the minimum Z value of 60 is not equal to its maximum but has the relationship Zmax 54<Zmin 60<Zmax 56. Thus, a comparison of Z values cannot be used to conclude any occlusion relationship between 60 and either 56 or 58.

As in the previous example, the six spans are processed, in the same order, starting with an initialized tree with the same scan as a top node. The processing of the first four spans 52, 54, 56 and 58 is identical to that of the previous example. Thus, after the processing of span 58, the occlusion tree is as shown in FIG. 4D.

However, unlike the previous example, span 60 now is not occulted by the top node of the tree. The span 60 is tested subsequently for occlusion with the terminal node corresponding to the span 52, which occults 60, so there is no further processing.

The span 60 also is tested with the terminal node corresponding to span 54 (which occults 60, so there is no further processing), With the terminal nodes corresponding to 56 and 58, this results in 60 being added to the unresolved lists of both 56 and 58.

This processing does not result in a change to the maximum Z values already in the tree since Zmax 60 is greater than both Zmax 56 and Zmax 58 This is processing step 24 of FIG. 6. Span 62 is processed next, but since it is not opaque, the Zmax values of the tree cannot be altered.

Figure 5:
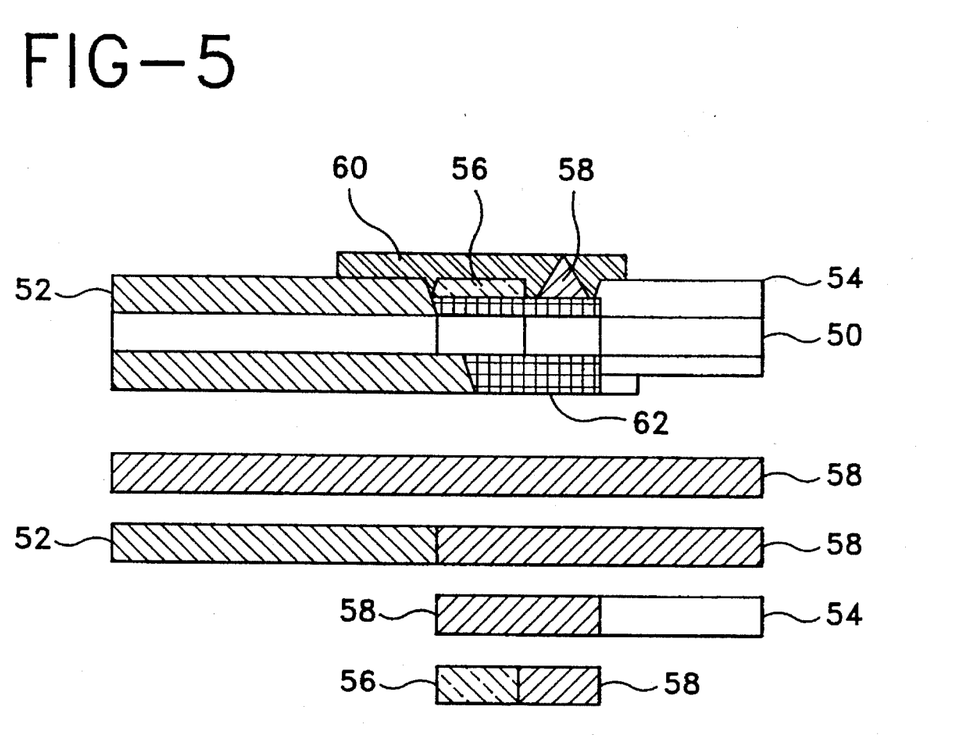
FIG. 5 is an occlusion tree that can be produced in accordance with the method of the present invention.

However, since Zmin 62 is less than the maximum Z values of both 56 and 58, it is added to the unresolved lists of both. The final results of this processing is illustrated in FIG. 5.

There are four terminal nodes of the final tree. The terminal nodes corresponding to Zmax 52 and Zmax 54 only have one span each on their unresolved lists, 52 and 54, respectively.

The unresolved lists of the terminal nodes corresponding to Zmax 56 and Zmax 58 contain spans 56 and 58, respectively, and in addition, both of these lists also contain spans 60 and 62. Thus, the method of this invention limits the need for more Z comparisons to the region covered by the last two nodes.

In a digital image generator, the output of the occlusion processing method of the present invention will drive additional circuitry that typically provides subpixel occlusion and antialiasing, smooth shading, texture and atmospheric haze effects that ultimately drives a video display. The apparatus for such additional processing is well known in the art.

The method of the invention may be implemented in a digital system using high speed digital signal processing chips, such as the Intel Corp. i860 or the Texas Instruments TMS320C40. Alternatively, application-specific integrated circuit technology could be used to embody the processing steps of this method. Products commercially available from LSI Logic, Inc. are well-suited to the later approach.

It should be understood that the foregoing examples are only illustrative of a preferred embodiment of the invention. Various alternatives and modifications can be devised by those skilled in the art without departing from the spirit and scope of the invention.

While the invention has been described in a real time simulation environment, it is equally applicable to other types of computer graphics systems. Accordingly, the present invention is intended to embrace all such alternatives and variances that fall within the scope and the spirit of the appended claims.

I claim:

1. In a digital image generator for generating video images to be displayed on a display screen in real time from a digital database of objects, an improved method of occlusion processing for an efficient determination of objects to be displayed visibly in predetermined pixel level regions, comprising the steps of:

(a) dividing a display screen, on which at least one object in said database of objects is to be displayed, into a predetermined hierarchy of regions forming a tree structure ranging from a highest covered region to a lowest covered pixel level region on said display screen, wherein each region in said hierarchy is rectangular with uniform boundaries of predetermined dimensions in a first axis, and wherein said highest covered region covers the full dimension of the display screen in a second axis;

(b) subdividing an object in said database to provide data pieces corresponding to said highest of said covered regions of said hierarchy of regions on said display screen;

(c) performing a predetermined test on each of said pieces of said object to reveal information as to whether it is to be displayed within each of said regions, said information including whether said piece of said object occludes the region completely, is occluded completely within the region, or is occluded partially within the region;

(d) developing updated hierarchy information for each region in which an object piece occludes any other piece;

(e) deleting from said hierarchy each object piece that is occluded in a region of said hierarchy;

(f) further subdividing said object in correspondence to a next lower region of said hierarchy for each of said pieces that is partially occluded;

(g) repeating steps (c) through (f) until each subdivided piece is occluded, updates said hierarchy, or until a pixel-level region of said hierarchy is reached; and (h) repeating steps (b) through (g) for each object in said database of objects;

whereby the occlusion for said predetermined pixel level regions of an image is accomplished efficiently.

2. The method of claim 1 wherein said step of subdividing an object includes subdividing said display screen into at least two vertical strips.

3. The method of claim 2 including the step of subdividing each of said strips into a predetermined arrangement according to a binary tree.

4. The method of claim 3 wherein said step of subdividing said strips into predetermined boundaries includes boundaries containing areas corresponding to predetermined pixel arrangements.

5. The method of claim 4 wherein said predetermined pixel arrangements selected includes at least one hundred pixels.

6. The method of claim 5 wherein said number of pixels selected is limited to contiguous pixels.

7. The method of claim 1 wherein said step of updating said hierarchy information includes making an additional test for transparency.

8. The method of claim 7 including the step of making a list of transparent contributions.

9. The method of claim 8 including the step of adding said list of transparent contributions to said hierarchy of information.

10. The method of claim 2 wherein the screen is additionally subdivided into at least two predetermined horizontal strips whose boundaries correspond to said pixel level regions, the objects are additionally subdivided according to said horizontal strips, and the method of claim 2 is applied within each horizontal strip.

\* \* \* \* \*